Dec. 28, 1948.  H. W. GROTE ET AL  2,457,146
PROCESS FOR PRODUCING HIGH BOILING POLYMERS
Filed June 27, 1947
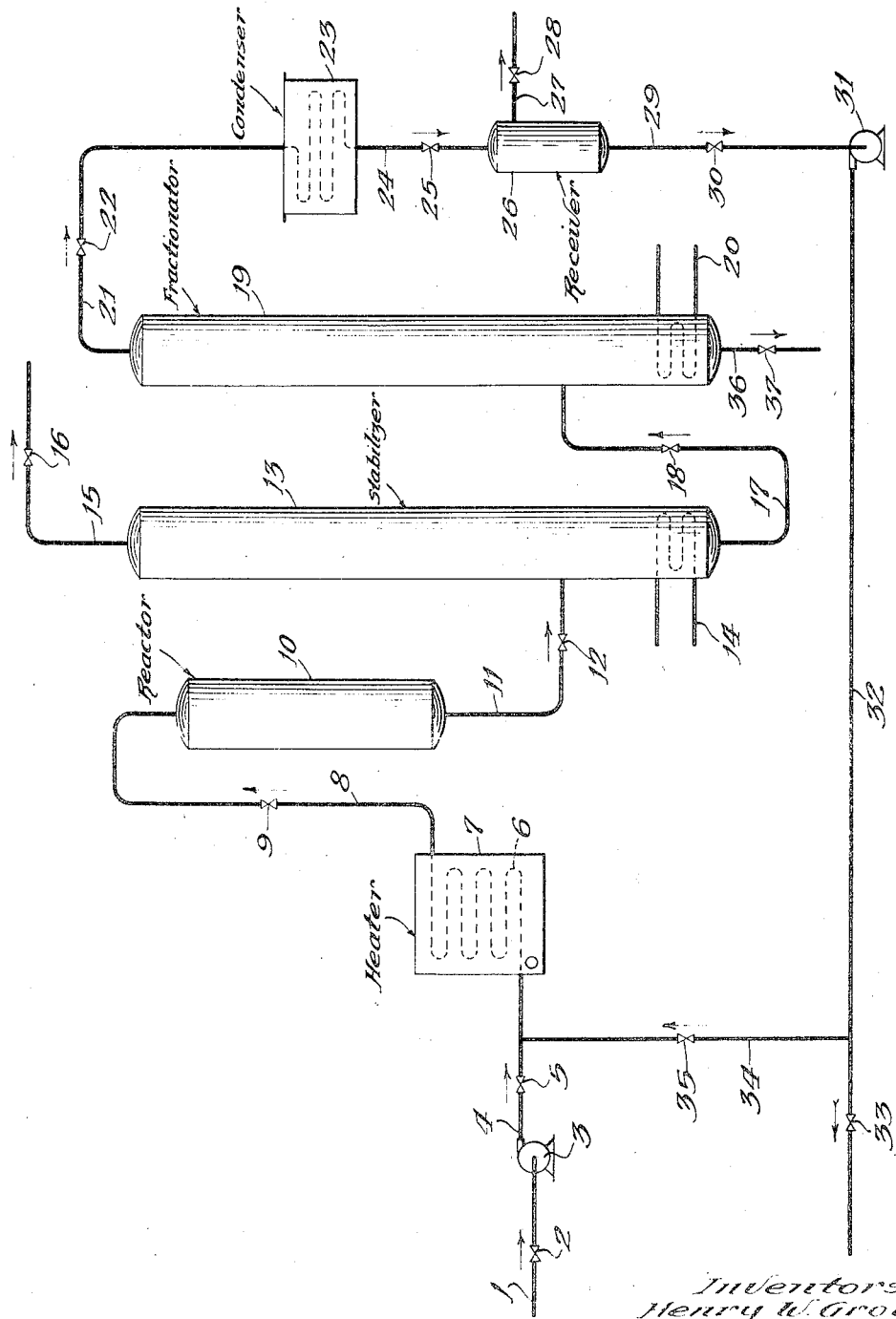
Inventors:
Henry W. Grote
Robert L. Swoope
Charles S. Brearley, Jr.
By Maynard P. Venema
Attorney Patented Dec. 28, 1948

2,457,146

UNITED STATES PATENT OFFICE 2,457,146

PROCESS FOR PRODUCING HIGH BOILING POLYMERS

Henry W. Grote, Downers Grove, Robert L. Swoope, Berwyn, and Charles S. Brearley, Jr., Riverside, Ill., assignors to Universal Oil Products Company, Chicago, Ill., a corporation of Delaware Application June 27, 1947, Serial No. 757,512

15 Claims. (Cl. 260—683.15)

This invention relates to the production of long chain olefinic polymers and particularly long chain olefins having relatively straight chain configurations which are especially useful for the alkylation of aromatic hydrocarbons and the production of detergents of the alkyl aryl sulfanate type.

A highly efficient type of detergent has been developed by the prior art characterized as an alkyl aryl sulfonate containing one and not more than one alkyl group of from about 10 to about 18 carbon atoms per group and preferably of straight or slightly branched chain configuration, said detergents being further characterized in that they contain less than 3 and preferably not more than one other alkyl substituent containing less than 3 carbon atoms per group, an aromatic nucleus, preferably benzenoid, and a sulfonate salt radical, the cation of which is of metallic or non-metallic composition derived from the corresponding inorganic base or organic nitrogen-containing bases.

One method of producing the above type of detergent comprises alkylating an aromatic hydrocarbon, which if benzenoid, may be selected from the group consisting of benzene, toluene, xylene, ethylbenzene, methylethylbenzene and diethylbenzene, with a suitable, preferably straight chain, olefinic hydrocarbon containing from about 10 to about 18 carbon atoms per molecule, sulfonating the resultant alkyl aryl hydrocarbon, and neutralizing the sulfonic acid formed thereby with an organic nitrogen-containing base or an inorganic alkali, as desired.

The present invention is concerned primarily with the preparation of a suitable olefinic charging stock utilizable as the alkylating agent for the preparation of detergents of the above type, said olefinic alkylating agent being formed by polymerizing propylene.

One object of this invention is to provide an improved process for polymerizing propylene to form monoolefins having from about 10 to about 18 carbon atoms per molecule which may be utilized in the preparation of detergents of the alkyl aryl sulfonate type.

Another object of this invention is to increase the yield of desirable olefinic polymers boiling from about 335° to about 435° F. produced in polymerizing propylene.

A further object of this invention is to produce monoolefinic polymers boiling from about 335° to about 435° F. from propylene and propylene polymers having less than about 12 carbon atoms per molecule.

One specific embodiment of this invention relates to a process which comprises polymerizing substantially dry propylene in the presence of a solid polymerization catalyst, continuously isolating from the resultant product a fraction containing olefins with from about 10 to about 18 carbon atoms per molecule, and recycling polymers containing less than about 12 carbon atoms per molecule to the polymerization zone together with additional propylene-containing fresh charging stock.

Another embodiment of this invention relates to a process for producing polymers boiling from about 335° to about 435° F. which comprises reacting a mixture of a propane-propylene fraction and a propylene polymer fraction boiling below about 335° F. to contact with a solid phosphoric acid catalyst at a temperature of from about 250° to about 450° F. and at a pressure of from about 100 to about 2000 pounds per square inch, fractionally distilling the resultant product to separate the desired polymer fraction from lower boiling and higher boiling polymers and recycling at least a portion of said lower boiling polymers to the initial polymerization zone.

A further embodiment of this invention relates to a process for producing polymers boiling from about 355° F. to about 410° F. which comprises reacting a mixture of a propane-propylene fraction and a propylene polymer fraction boiling below about 355° F. in contact with a solid phosphoric acid catalyst at a temperature of from about 275° to about 375° F. and at a pressure of from about 600 to about 1200 pounds per square inch, fractionally distilling the resultant product to separate the desired polymer fraction from lower boiling and higher boiling polymers, and recycling at least a portion of said lower boiling polymers to the initial polymerization zone.

We have found that the production of high boiling polymers (particularly tetramers and higher polymers) from propylene and its low boiling polymers is improved by carrying out the polymerization treatment on substantially dry feed stock in the presence of solid phosphoric acid catalyst prepared as indicated in Patent 1,993,513 and others. This finding is contradictory to previous experience in the production of motor fuel of gasoline boiling range by the polymerization of propylene and propylene-butylene mixtures from hydrocarbon gas mixtures containing also propane, butanes, and other normally gaseous hydrocarbons. In olefin polymerization operations to produce polymer gasoline, it has been a customary operating practice to add water or steam at the inlet of each polymerization reactor containing a solid phosphoric acid catalyst in order to maintain the hydration state and activity of the catalyst and to reduce a tendency to deposit coke or cokelike materials on the catalyst. Now we have found in the polymerizing of a propane-propylene fraction in the presence of a recycled liquid polymer, such as nonylene, that decreasing the water content of the feed stock both increases the conversion per pass at a given set of process conditions and also improves the yield of $C_{12}$ and higher olefins based upon the amount of propylene converted. The observed operation with dry feed stocks is realized only when substantially large quantities of liquid polymers are recycled to the reaction section so that the concentration of liquid polymers is relatively high in the catalyst bed. This type of polymerization treatment produces a high yield of propylene tetramers and higher polymers from propylene and its polymers, the latter containing up to about 12 carbon atoms per molecule.

It is well-known that the so-called solid phosphoric acid catalyst can be employed for a considerable length of time without regeneration in the polymerization of propylene to produce polymers boiling within the gasoline range. The maintenance of the catalyst activity for extended periods of operation is accomplished by introducing small amounts of water thereby maintaining the catalyst in the selected state of hydration necessary for the retention of its activity at a catalyst temperature generally from about 450° to about 550° F. Catalyst lives of the order of about 100 to 125 gallons of polymers per pound of catalyst are quite common in the gasoline producing operations. However, when the phosphoric acid catalyst was employed to produce olefinic polymers containing long chain olefinic hydrocarbons having from about 10 to about 18 carbon atoms per molecule by the recycling of polymers having a lower number of carbon atoms, we have found that the activity of the solid phosphoric acid catalyst fell off very rapidly and catalyst lives of only about 5 to 10 gallons per pound were realized. We discovered that instead of requiring the maintenance of a specific water content to keep the catalyst in the hydrated state such as was necessary in the gasoline producing operation, the exact opposite was necessary in the production of long chain olefinic hydrocarbons from propylene and recycled low boiling polymers. In order to obtain catalyst life sufficiently high to make the operation commercially feasible when recycling polymers, we found that it was essential to maintain the water content of the fresh propylene feed below about 0.03 mole per cent. When water contents in substantial excess of this are employed, the catalyst instead of retaining its activity as would be expected, based upon the experience in the polymerization of propylene for gasoline, actually loses its activity rapidly.

Our process is also carried out in a continuous manner by directing a propane-propylene fraction and a mixture of propylene polymers to a reactor of suitable design containing a solid phosphoric acid catalyst, particularly a precalcined composite of an acid of phosphorus and diatomaceous earth or another siliceous adsorbent as montmorillonite, etc., maintained at a temperature of from about 250° to about 450° F. and at a pressure of from about 100 to about 2000 pounds per square inch. The process is carried out preferably at a catalyst temperature of from about 275° to about 375° F. and at a pressure of from about 600 to about 1200 pounds per square inch. By this treatment, a substantial proportion of the propylene present in the charged propane-propylene mixture is converted into polymers including the trimers, tetramers, pentamers, and higher boiling polymers of propylene. In order to produce relatively high yields of higher boiling polymers, we have found it advantageous to segregate the lower boiling polymers as by fractional distillation and recycle these lower boiling polymers, containing a relatively high proportion of nonylenes, to the polymerization reactor to which the fresh propane-propylene fraction is charged.

The recycle stock to the polymerization reactor may also comprise monoolefins, preferably of straight chain or mildly branched chain structures, from any source such as another polymerization process or a hydrocarbon cracking or dehydrogenating process which yields a mixture of saturated and monoolefinic hydrocarbons containing from about 6 to 12 carbon atoms per molecule.

Furthermore, in order to obtain a relatively high yield of polymers boiling from about 335° to about 435° F., we have found it necessary to dry the propane-propylene charging stock so that it contains not more than about 0.03 mole per cent and preferably not more than about 0.1 mole per cent of water. When the mixture of propane-propylene fraction and recycled polymers is substantially dry, 60 to 80% or more of the resultant polymer is obtained boiling in the desired range of from about 335° to about 435° F.

The amount of water permissible in the mixture of propane-propylene fraction and recycle stock is also dependent upon the polymerization temperature and pressure used. At the highest temperatures in the range of 250° to about 450° F., a greater proportion of water may be present than when operating at the lower temperatures. The amount of water in the combined feed may also be greater at low pressures than at high pressures.

In order to obtain these relatively high yields of the higher boiling polymer fractions, the liquefied propane-propylene fraction charged to the process is commingled with from about 0.2 to about 5 times its volume of propylene polymers boiling below 335° F. The hydrocarbon mixture thus charged to contact with the solid phosphoric acid catalyst contains between about 0.2 volume of propylene polymers to one volume of fresh $C_3$ fraction, and 5 volumes of low boiling polymers to one volume of fresh $C_3$ fraction. Thus the volumetric ratio of combined feed to fresh $C_3$ fraction is from about 1.2 to about 6 while the preferred volumetric combined feed ratio is from about 2.0 to about 3.5, that is, one volume of liquid $C_3$ fraction and from 1.0 to 2.5 volumes of low boiling liquid polymers. In order to produce a relatively high yield of long chain olefinic hydrocarbons containing from about 10 to about 18 carbon atoms per molecule, the fresh propane-propylene fraction is also charged at a rate corresponding to an hourly space velocity of liquid $C_3$ fraction of from 0.1 to about 5. By the term "hourly liquid space velocity" we mean the volumes of liquid charged per hour per volume of catalyst. This range of fresh propane-propylene feed rates is influenced by the ultimate conversion of propylene required, as in some instances high conversions corresponding to the low feed rates may be desirable, and, on the other hand, in other cases, low conversions may be satisfactory which can be obtained by operations at high feed rates.

The propane-propylene fraction charged to the process may be dried by any convenient means such as distillation, or by passage through a tower containing activated alumina which adsorbs water from the hydrocarbon charging stock, or the propane-propylene fraction may be cooled to a relatively low temperature so as to remove substantially all of the water originally present therein. Other means such as by scrubbing with a high boiling glycol or other suitable dehydrating agent may also be employed.

The preferred polymer fraction formed by our process and boiling from about 335° to about 435° F. at a pressure of 760 mm. of mercury consists essentially of monoolefinic hydrocarbons having from about 10 to about 14 carbon atoms per molecule and having a substantially large proportion of monoolefinic hydrocarbons having 12 carbon atoms per molecule. These monoolefinic hydrocarbons may be used as hereinafter set forth to produce alkyl aromatic hydrocarbons convertible (by sulfonation and neutralization by a base) into surface active compounds useful as detergents.

The process of this invention is illustrated further by the attached drawing which represents a suitable apparatus in which the process may be carried out. Thus a propane-propylene fraction containing from about 30 to about 60% of propylene, a relatively large amount of propane and small amounts of paraffinic and olefinic hydrocarbons containing 2 and 4 carbon atoms per molecule is introduced through line 1 and valve 2 to pump or compressor 3 which discharges through line 4 and valve 5 into heating coil 6 which receives heat from heater 7. From coil 6 the heated hydrocarbons are directed through line 8 and valve 9 to reactor 10 containing one or more beds or sections of solid phosphoric acid catalyst which is a precalcined composite of phosphoric acids and diatomaceous earth. From reactor 10, the resultant mixture of propane, unconverted propylene and propylene polymers is discharged through line 11 and valve 12 into stabilizer 13 which receives heat from reboiler coil 14.

Gaseous hydrocarbons separated from the polymers in stabilizer 13 are directed therefrom through line 15 and valve 16 to storage or other use not indicated in the diagrammatic drawing, while the stabilized liquid polymers are discharged from stabilizer 13 through line 17 and valve 18 into fractionator 19 to which heat is supplied by means of reboiler coil 20.

From the top of fractionator 19, a mixture of low boiling polymers such as those containing from 6 to 12 carbon atoms are distilled overhead and directed through line 21 and valve 22 to condenser 23 and the resultant mixture of condensate and uncondensed vapors is then passed through rundown line 24 and valve 25 to receiver 26 provided with gas release line 27 containing valve 28. The liquefied low boiling polymers comprising essentially $C_6$ to $C_{12}$ olefins which are also collected in receiver 26 are withdrawn continuously therefrom through line 29 and valve 30 by pump 31 which discharges through line 32 containing valve 33. At least a portion of the hydrocarbons being passed through line 32 are directed therefrom through branch line 34 and valve 35 into line 4, already mentioned, through which the fresh propane-propylene fraction is charged to the polymerization process. If desired, some of the recycle stock may be discharged from line 32 through valve 33 to storage or other use not illustrated in the drawing. Also, a portion of the low boiling polymers passing through line 32 may be returned to near the top of fractionator 19, by means not indicated in the drawing, to assist in controlling the temperatures therein.

The desired polymer fraction from which the low boiling polymers are so separated in fractionator 19 accumulate near the bottom of said fractionator and are withdrawn therefrom through line 36 and valve 37 to cooling and storage not illustrated in the drawing. The higher boiling polymer fraction thus discharged through line 36 is useful for alkylating an aromatic hydrocarbon to form an alkyl aromatic hydrocarbon convertible into a detergent of the alkaryl sulfonate type. If desired, this higher boiling polymer fraction may be fractionally distilled to separate a fraction of desired boiling range from a higher boiling residue.

The following examples illustrate the results obtained in polymerizing propylene by our process to form high yields of polymer fractions boiling above about 335° F. and suitable for use as alkylating agents for producing alkaryl sulfonate type detergents.

EXAMPLE I

Several runs were made in which a substantially dry hydrocarbon fraction containing 0.2 mole per cent ethylene, 3.0 per cent ethane, 33.3 per cent propylene, 63.1 per cent propane, 0.1 per cent butylene, and 0.3 per cent butane was commingled with polymers formed from said gas mixture and boiling between about 100° and 356° F. The commingled mixture of $C_3$ hydrocarbons and low boiling propylene polymers was then reacted at a temperature (reactor peak temperature) of about 300° to about 400° F. in the presence of a calcined composite of pyrophosphoric acid and diatomaceous earth in the form of 5 x 5 mm. cylindrical pellets. The polymerization runs referred to in Table 1 were carried out at a gage pressure of 750 to 760 pounds per square inch.

Other operating conditions such as the mole per cent of water present in the propane-propylene charging stock and the hourly rate at which this charging stock was charged to the process are indicated in the table together with the yields of polymer fraction boiling from 356° to 410° F. and indicated broadly as the "tetramer fraction." The water present in the combined feed to the polymerization reactor was determined by the Karl Fischer method (Angew. Chem. 48, 394 (1935)), by which water contents in excess of about 0.0008 mole per cent may be determined.

TABLE 1

*Polymerization of propane-propylene fraction in the presence of solid phosphoric acid catalyst*

| Run No | 1 | 2 | 3 |
|---|---|---|---|
| Duration of Test, Hours | 24 | 9 | 29 |
| Processing Conditions: | | | |
| Reactor Preheater Outlet, Temperature, °F | 266 | 355 | 390 |
| Reactor Peak Temperature, °F | 300 | 399 | 399 |
| Reactor Pressure, pounds | 750 | 751 | 760 |
| Combined Feed Ratio (Volumetric) | 2.13 | 1.99 | 1.94 |
| Liquid Hourly Space Velocity Fresh Feed | 0.36 | 0.58 | 0.50 |
| Liquid Hourly Space Velocity Combined Feed | 0.77 | 1.16 | 0.98 |
| BPD [1] Fresh Feed per 1000 pounds Catalyst | 26.6 | 43.1 | 36.7 |
| BPD [1] Propylene per 1000 pounds Catalyst | 8.2 | 13.8 | 10.6 |
| Mol. Percent Water in Combined Feed | 0.00 | 0.03 | 0.03 |
| Yields of Polymers 356–410°F. Fraction: | | | |
| Pounds/Pound of Propylene Charged | 0.66 | 0.52 | 0.45 |
| Pounds/Pound of Propylene Converted | 0.83 | 0.56 | 0.52 |
| Volume per cent of Propylene Charged | 44.7 | 35.6 | 30.4 |
| Pounds/Hour/Pound of Catalyst | 0.036 | 0.040 | 0.031 |
| Total Net Polymer Products: | | | |
| I. B. P.—356°F | 7.7 | 15.5 | 17.4 |
| 356°–410°F | 83.5 | 56.4 | 52.0 |
| Above 410°F | 8.8 | 28.1 | 30.6 |
| Total | 100.0 | 100.0 | 100.0 |

[1] Barrels of liquid per day (24 hours).

The results in Table 1 show that higher yields of olefinic polymers boiling from 356° to 410° F. were obtained from the dry charging stock (0.00 per cent water) than were obtained when the combined feed comprising fresh propane-propylene fraction and recycled polymers (I. B. P. to 356° F. boiling range) contained 0.03 mole per cent of water.

EXAMPLE II

Another polymerization run was made on a propane-propylene fraction containing 42 mole per cent propylene and using a solid phosphoric acid catalyst analyzing 62 per cent $P_2O_5$ formed by calcining at about 370° C. (698° F.) a composite of phosphoric acid (essentially pyrophosphoric) and diatomaceous earth. In Table 2 which gives the operating conditions and results, the statement of "less than 0.0008 mole per cent water in the combined feed" is approximately the minimum amount determined by the method of water analysis used also on the fresh propane-propylene fraction charged. The fresh propane-propylene fraction was definitely dryer than this value and the combined feed was dryer still because the polymers recycled were dehydrated in the plant depropanizer.

TABLE 2

*Polymerization of propane-propylene fraction in the presence of solid phosphoric acid catalyst*

| | |
|---|---|
| Duration of test, hours | 12 |
| Processing conditions: | |
| Reactor inlet temperature, °F | 281 |
| Reactor peak temperature, °F | 354 |
| Reactor pressure, pounds per square inch gage | 755 |
| Combined feed ratio (volumetric) | 3.06 |
| Liquid hourly space velocity on fresh feed | 0.66 |
| Liquid hourly space velocity on combined feed | 2.02 |
| BPD fresh feed per 1000 pounds of catalyst | 48.8 |
| BPD propylene per 1000 pounds of catalyst | 19.7 |
| Mole per cent water in combined feed less than | 0.0008 |
| Catalyst age, gallons of fract. bottoms per pound | 4.24 |
| Conversion on propylene | 74 |
| Experimental recovery, weight per cent | 97.3 |
| Yields (at 100% recovery): | |
| 356°–410° F. fraction— | |
| Pounds per pound of propylene charged | 0.53 |
| Pounds per pound of propylene converted | 0.72 |
| Volume per cent of propylene charged | 36.1 |
| Pounds per hour per pound of catalyst | 0.07 |
| 338–438° F. fraction of bottoms, pounds per pound of propylene converted | 0.80 |
| Weight per cent of propylene charged— | |
| Propylene in spent gas | 26 |
| Total polymer product | 74 |
| Net fractionator overhead liquid | 10.9 |
| Weight per cent of propylene converted— | |
| Net fractionator overhead liquid: | |
| I. B. P.—356° F | 14.0 |
| Above 356° F | 0.7 |
| Total | 14.7 |
| Total polymer product— | |
| I. B. P. to 356° F | 22.0 |
| 356–410° F | 71.7 |
| Above 410° F | 6.3 |
| Inspections: | |
| Fresh feed mole per cent propylene | 42.0 |
| Combined feed mole per cent propylene (calculated) | 20.8 |
| Stabilizer gas mole per cent propylene | 15.8 |
| Fractionator overhead liquid (recycle), specific gravity at 60° F | 0.7378 |
| Fractionator overhead liquid: | |
| Engler distillation— | |
| Initial boiling point ° F | 144 |
| End point ° F | 353 |
| Podbielniak distillation — liquid volume per cent above 356° F | 5.0 |
| Average molecular weight | 124 |
| Weight per cent olefins, before and after test | 91–92 |
| Fractionator bottoms (tetramers and higher polymers): | |
| Specific gravity at 60° F | 0.7775 |
| Engler distillation— | |
| Initial boiling point ° F | 356 |
| End point ° F | 469 |
| Podbielniak distillation, liquid volume per cent— | |
| I. B. P. to 356° F | 9.5 |
| 356° to 410° F | 83.5 |
| 410° to 428° F | 1.8 |
| 428° to 446° F | 2.8 |
| 446° to 464° F | 1.4 |
| Above 464° F | 1.0 |
| Volume per cent (356° to 410° F.) in fraction boiling above 356° F | 92.3 |
| I. B. P. to 338° F | 3.3 |
| 338° to 438° F | 92.9 |
| 356°–410° F. fraction: | |
| Specific gravity at 60° F | 0.7766 |
| Bromine number | 106 |

The results given in Table 2 show that the total polymer product contained 22 per cent of polymers boiling below 356° F., 71.7 per cent of the fraction boiling from 356° to 410° F., and 6 per cent of higher boiling hydrocarbons. The fractionator bottoms which comprised the polymers remaining after removal of the recycle stock contained 92.9 liquid volume per cent of hydrocarbons boiling from 338° to 438° F. and 83.5 per cent of essentially monoolefinic hydrocarbons boiling from 356° to 410° F. About 6 per cent of the fractionator bottoms boiled from 410° to 464° F. at a pressure of one atmosphere absolute.

EXAMPLE III

The run referred to in Example II at a pressure of about 750 pounds per square inch was continued for 927 hours on the propane-propylene fraction containing 40–42 mole per cent propylene and then for 244 hours more on a C₃ fraction containing 31–33 per cent propylene during which time a total of 14.8 gallons of polymers were produced per pound of catalyst. These C₃ fractions were dry so that the combined feed contained less than 0.0008 mole per cent of water. The total production of the 338–438° F. fraction of these polymers corresponded to 13.7 gallons per pound of catalyst, after which the run was discontinued although the catalyst was still active and in good physical condition and could have been employed for a longer period of time. Results obtained in these runs are shown in Table 3.

EXAMPLE IV

The results given in Example III show that solid phosphoric acid catalyst remained active for a long period of time when operating on a dry mixture of a propane-propylene fraction and propylene polymers containing up to about 12 carbon atoms per molecule. This long life of the catalyst is unexpected since previous work on polymerization of propylene in the absence of polymer recycle indicated that it was necessary to add water vapor or steam to the charged propane-propylene fraction in order to prevent catalyst dehydration and rapid loss of catalyst activity.

Table 4 shows a comparison of results obtained when polymerizing propylene from dry and moist propane-propylene fractions in the presence of solid phosphoric acid catalyst by non-selective polymerization without polymer recycle.

TABLE 4

*Non-selective polymerization of dry and moist propane-propylene fractions*

|  | Dry Gas | Moist Gas |
|---|---|---|
| Propylene content of propane-propylene fraction, mole per cent | 34.7 | 26.0 |
| Water Content of propane-propylene fraction, mole per cent | 0.00 | 2.5 |
| Processing Temperature, °F | 435 | 435 |
| Processing Pressure, pounds per square inch | 132 | 175 |
| Total hours of operation | 42 | 360 |
| Decrease in catalyst activity, per cent | 70 | None |
| Weight gain of catalyst, per cent | 4.5 | 1.8 |
| Polymer production per pound of catalyst | 0.7 | 4.5 |

TABLE 3

*Conversion of propylene and recycled I. B. P.— 356° F. polymers into higher boiling olefins in the presence of solid phosphoric acid catalyst*

| Period No. | 3 | 8 | 9 | 10 | 11 | 12 | 13 |
|---|---|---|---|---|---|---|---|
| Fresh Feed, mole per cent C₃H₆ | 41.8 | 42.8 | 41.9 | 40.3 | 32.4 | 31.5 | 33.4 |
| Combined Feed, mole per cent C₃H₆ | 20.9 | 21.0 | 21.4 | 20.2 | 16.2 | 16.1 | 17.3 |
| Total operating time since beginning of run, hours | 499 | 801 | 882 | 927 | 1,085 | 1,142 | 1,171 |
| Reactor preheater. temp. °F | 280 | 245 | 255 | 262 | 310 | 310 | 310 |
| Max. Catalyst temp. °F | 350 | 350 | 350 | 353 | 371 | 370 | 369 |
| Combined Feed ratio, volumetric | 3.0 | 3.1 | 2.9 | 3.0 | 2.8 | 2.9 | 2.9 |
| L. H. S. V., Fresh Feed | 0.70 | 0.66 | 0.69 | 0.69 | 0.92 | 0.92 | 0.92 |
| L. H. S. V., Combined Feed | 2.10 | 2.03 | 2.01 | 2.05 | 2.62 | 2.68 | 2.64 |
| Cat. age, gal. of 338–438° F. fraction per pound catalyst | 3.59 | 7.8 | 9.3 | 9.8 | 12.2 | 13.2 | 13.7 |
| Conversion of propylene, per cent | 68 | 73 | 74 | 72 | 75 | 73 | 77 |
| Polymer yields, wt. per cent of C₃H₆ converted: |  |  |  |  |  |  |  |
| I. B. P.—356° F. | 12.7 | 7.1 | 20.3 | 17.9 | 16.2 | 15.5 | 18.9 |
| 356°–410° F. | 79.4 | 80.7 | 68.2 | 66.5 | 65.9 | 66.1 | 64.1 |
| Above 410° F. | 7.9 | 12.2 | 11.5 | 15.6 | 17.9 | 18.4 | 17.0 |
| 356–410° F. Fraction Specific Gravity at 60° F | 0.775 | 0.775 | 0.777 | 0.775 | 0.775 | 0.775 | 0.776 |
| Bromine Number | 105 | 104 | 103 | 102 | 98 | 98 | 99 |
| Fraction 338–438° F. vol. per cent of total polymers | 98.0 | 90.4 | 87.1 | 88.9 | 77.7 | 82.1 | 83.9 |

The results given in Table 3 show that the polymers produced in the different periods of this run contained from about 80 to about 64 per cent by weight of the fraction boiling between 356° and 410° F. and consisting essentially of monoolefinic hydrocarbons. It is also noted that the polymer fraction boiling from 338° to 438° F. represented 78 to 98 per cent by volume of the total polymers. During the 1171 hours in which this catalyst was used, a total of 13.7 pounds of the 338° to 438° F. fraction of polymers was obtained per pound of catalyst. In these different periods of the run, the conversion of propylene was maintained between 68 and 77 per cent per pass by gradually increasing the reactor preheater temperature and also the maximum temperature of the catalyst, while the combined feed ratio was maintained at 2.8 to 3.2.

At the end of period 13, the catalyst was still highly active and could have been used for a longer time if desired.

The above data show the rapid decrease in the activity of the polymerization catalyst when processing a dry propane-propylene fraction in the absence of polymer recycle. The test made on the propane-propylene fraction containing 2.5 mole percent of water vapor was discontinued after fifteen days and at the end of which time there was no drop in the activity of the catalyst. A much longer catalyst life than the indicated 4.5 gallons of polymer per pound of catalyst could have been obtained had the test been continued. Thus in polymerizing propylene by non-selective polymerization which is a once-through operation, it is essential that sufficient water, water vapor, or steam be charged with the fresh propane-propylene fraction in order that the sum of the water already present in the gas stream plus that added be sufficient to prevent loss of water from the catalyst.

The changes in the once through polymerizing activities of the catalysts operating on dry and moist (2.5 mole percent water) propane-propylene fractions, are indicated further by Table 5.

TABLE 5

*Changes in catalyst activities of solid phosphoric acid catalyst operated on dry and moist propane-propylene fractions*

| Time on test, hours: | Propylene Polymerization, per cent | |
| --- | --- | --- |
|  | Dry Propane-Propylene Fraction | Moist Propane-Propylene Fraction |
| 6 | 76 |  |
| 12 |  | 74 |
| 15 | 60 |  |
| 24 | 32 |  |
| 30 | 23 |  |
| 36 | 15 | 76 |
| 42 | 8 |  |
| 85 |  | 70 |
| 180 |  | 76 |
| 300 |  | 72 |
| 360 |  | 75 |

We claim as our invention:

1. A process which comprises polymerizing propylene containing not more than about 0.03 mole per cent of water in the presence of a solid polymerization catalyst containing a phosphoric acid catalyst compound, isolating from the resultant polymer product a fraction comprising essentially olefins with more than about 10 carbon atoms per molecule, and recycling polymers containing less than about 12 carbon atoms per molecule to the polymerization zone together with additional fresh propylene-containing charging stock.

2. A process for producing polymers boiling from about 335° to about 435° F. which comprises reacting a mixture of a propane-propylene fraction and a propylene polymer fraction boiling below about 335° F., said mixture containing not more than about 0.03 mole per cent of water, in contact with a solid phosphoric acid catalyst at a temperature of from about 250° to about 450° F. and at a pressure of from about 100 to about 2000 pounds per square inch, fractionally distilling the resultant product to separate the desired polymer fraction from lower boiling and higher boiling polymers, and recycling at least a portion of said lower boiling polymers to the polymerization zone.

3. A process for producing polymers boiling from about 355° to about 410° F. which comprises reacting a mixture of a propane-propylene fraction and a propylene polymer fraction boiling below about 355° F., said mixture containing not more than about 0.03 mole per cent of water, in contact with a solid phosphoric acid catalyst at a temperature of from about 275° to about 375° F. and at a pressure of from about 600 to about 1200 pounds per square inch, fractionally distilling the resultant product to separate the desired polymer fraction from lower boiling and higher boiling polymers, and recycling at least a portion of said lower boiling polymers to the polymerization zone.

4. A process for producing polymers boiling from about 355° F. to about 410° F. which comprises reacting a mixture of one liquid volume of a propane-propylene fraction containing not more than about 0.03 mole per cent of water and from about 0.2 to about 5 liquid volumes of a propylene polymer fraction boiling below about 355° F. in contact with a solid precalcined composite of an acid of phosphorus and a siliceous adsorbent at a temperature of from about 250° to about 450° F. and at a pressure of from about 600 to about 1200 pounds per square inch, fractionally distilling the resultant product to separate the desired polymer fraction from lower boiling and higher boiling polymers, and recycling at least a portion of said lower boiling polymers to the polymerization zone.

5. A process for producing polymers boiling from about 355° to about 410° F. which comprises reacting a mixture of one liquid volume of a propane-propylene fraction containing not more than about 0.03 mole per cent of water and from about 0.2 to about 5 liquid volumes of a propylene polymer fraction boiling below about 355° F. in contact with a solid precalcined composite of a phosphoric acid and diatomaceous earth at a temperature of from about 250° to about 450° F. and at a pressure of from about 600 to about 1200 pounds per square inch, fractionally distilling the resultant product to separate the desired polymer fraction from lower boiling and higher boiling polymers, and recycling at least a portion of said lower boiling polymers to the polymerization zone.

6. A process for producing polymers boiling from about 335° to about 435° F. which comprises reacting a mixture of one liquid volume of a propane-propylene fraction containing not more than about 0.03 mole per cent of water and from about 1.0 to about 2.5 liquid volumes of propylene polymer fraction boiling below about 335° F. in contact with a solid precalcined composite of a phosphoric acid and diatomaceous earth at a temperature of from about 250° to about 450° F. and at a pressure of from about 600 to about 1200 pounds per square inch, fractionally distilling the resultant product to separate the desired polymer fraction from lower boiling and higher boiling polymers, and recycling at least a portion of said lower boiling polymers to the polymerization zone.

7. A continuous process which comprises polymerizing propylene containing not more than about 0.03 mole per cent of water in the presence of a solid phosphoric acid polymerization catalyst, continuously isolating from the resultant product a fraction comprising essentially olefins with more than 10 carbon atoms per molecule and continuously recycling polymers containing less than about 12 carbon atoms per molecule to the polymerization zone together with additional fresh propylene-containing charging stock.

8. A continuous process for producing polymers boiling from about 335° to about 435° F. which comprises reacting a mixture of propane-propylene fraction and a propylene polymer fraction boiling below about 335° F. said mixture containing not more than about 0.03 mole per cent of water, in contact with a solid phosphoric acid catalyst at a temperature of from about 250° to about 450° F. and at a pressure of from about 100 to about 2000 pounds per square inch, continuously fractionally distilling the resultant product to separate the desired polymer fraction from lower boiling and higher boiling polymers, and continuously recycling at least a portion of said lower boiling polymers to the polymerization zone.

9. A continuous process for producing polymers boiling from about 355° to about 410° F. which comprising reacting a mixture of one liquid volume of a propane-propylene fraction containing not more than about 0.03 mole per cent of water and from about 0.2 to about 5 liquid volumes of a propylene polymer fraction boiling below about 355° F. in contact with a solid precalcined composite of a phosphoric acid and a diatomaceous earth at a temperature of from about 250° to about 450° F. and at a pressure of from about 600 to about 1200 pounds per square inch, continuously fractionally distilling the resultant product to separate the desired polymer fraction from lower boiling and higher boiling polymers, and continuously recycling at least a portion of said lower boiling polymers to the polymerization zone.

10. A continuous process for producing polymers boiling from about 335° to about 435° F. which comprises reacting a mixture of one liquid volume of a propane-propylene fraction containing not more than about 0.03 mole per cent of water and from about 1.0 to about 2.5 liquid volumes of a propylene polymer fraction boiling below about 335° F. in contact with a solid precalcined composite of a phosphoric acid and diatomaceous earth at a temperature of from about 250° to about 450° F. and at a pressure of from about 600 to about 1200 pounds per square inch, continuously fractionally distilling the resultant product to separate the desired polymer fraction from lower boiling and higher boiling polymers, and continuously recycling at least a portion of said lower boiling polymers to the polymerization zone.

11. A process for producing polymers boiling from about 335° to about 435° F. which comprises reacting a mixture of a propane-propylene fraction and a propylene polymer fraction boiling below about 335° F., said mixture containing not more than about 0.01 mole per cent of water, in contact with a solid phosphoric acid catalyst at a temperature of from about 250° to about 450° F. and at a pressure of from about 100 to about 2000 pounds per square inch, fractionally distilling the resultant product to separate the desired polymer fraction from lower boiling and higher boiling polymers, and recycling at least a portion of said lower boiling polymers to the polymerization zone.

12. A process for producing polymers boiling from about 335° to about 410° F. which comprises reacting a mixture of a propane-propylene fraction and a propylene polymer fraction boiling below about 355° F., said mixture containing not more than about 0.01 mole per cent of water, in contact with a solid phosphoric acid catalyst at a temperature of from about 275° to about 375° F. and at a pressure of from about 600 to about 1200 pounds per square inch, fractionally distilling the resultant product to separate the desired polymer fraction from lower boiling and higher boiling polymers, and recycling at least a portion of said lower boiling polymers to the polymerization zone.

13. A process for producing monoolefins boiling from about 335° to about 435° F. which comprises reacting a hydrocarbon mixture containing not more than about 0.03 mole per cent of water and comprising propylene and a monoolefin containing from 6 to 12 carbon atoms per molecule as its essential unsaturated constituents in contact with a solid phosphoric acid catalyst at a temperature of from about 250° to about 450° F. and at a pressure of from about 100 to about 2000 pounds per square inch, fractionally distilling the resultant monoolefinic product to separate the desired olefin fraction from lower boiling and higher boiling olefins, and recycling at least a portion of said lower boiling olefins to the polymerization zone.

14. A continuous process for producing monoolefins boiling from about 335° to about 435° F. which comprises reacting one liquid volume of a propane-propylene fraction containing not more than about 0.03 mole per cent of water and from about 0.2 to about 5 liquid volumes of a monoolefin fraction containing hydrocarbons with from 6 to 12 carbon atoms per molecule as its essential unsaturated constituents in contact with a solid precalcined composite of a phosphoric acid and a siliceous adsorbent at a polymerization temperature of from about 250° to about 450° F. and at a pressure of from about 100 to about 2000 pounds per square inch, fractionally distilling the resultant olefin-containing product and separating the desired olefin-containing fraction from a lower boiling fraction and a higher boiling fraction, and recycling at least a portion of said lower boiling fraction to the polymerization zone.

15. A process which comprises polymerizing propylene containing not more than about 0.03 mole per cent of water in the presence of a solid polymerization catalyst containing a phosphoric acid, isolating from the resultant polymer product a fraction comprising essentially olefins with more than about 10 carbon atoms per molecule, and recycling polymers containing less than about 12 carbon atoms per molecule to the polymerization zone together with additional fresh propylene-containing charging stock.

HENRY W. GROTE.
ROBERT L. SWOOPE.
CHARLES S. BREARLEY, Jr.

REFERENCES CITED

The following references are of record in the file of this patent:

UNITED STATES PATENTS

| Number | Name | Date |
|---|---|---|
| 2,040,658 | Kuentzel et al | May 12, 1936 |
| 2,143,566 | Moser | Jan. 10, 1939 |
| 2,176,354 | Nelson | Oct. 17, 1939 |
| 2,182,617 | Michel | Dec. 5, 1939 |